Feb. 9, 1960 A. C. LUTHER, JR 2,924,648

COLOR TELEVISION MATRIX AMPLIFIER

Filed Dec. 13, 1954

INVENTOR.
Arch C. Luther, Jr.
BY
[signature]
ATTORNEY

United States Patent Office
2,924,648
Patented Feb. 9, 1960

2,924,648

COLOR TELEVISION MATRIX AMPLIFIER

Arch C. Luther, Jr., Merchantville, N.J., assignor to Radio Corporation of America, a corporation of Delaware Application December 13, 1954, Serial No. 474,787

2 Claims. (Cl. 178—5.4)

This invention relates to color television matrix amplifiers, and in particular those matrix amplifiers which are used to generate the I and Q color difference signals from video signals representing the red, green and blue color content of an image.

In a color television system which employs red, green and blue signals as the primary color signals to generate a color television signal which conforms to present standards, I and Q color difference signals may be formed by combining red, green and blue signals according to the following relationships:

$$I=0.60R-0.28G-0.32B$$
$$Q=0.21R-0.52G+0.31B$$

It is seen from these relationships that not only must matrix circuits be employed which are capable of combining correct proportions of red, green and blue signals, but these matrix circuits must also be capable of providing signal polarity inversion since, for example, in the case of both the I and Q color difference signals, the component red signal is of positive polarity while the component green signal is of negative polarity. The component blue signal is of positive polarity in the Q color difference signal and of negative polarity in the I color difference signal.

It is therefore an object of this invention to provide a simplified matrix circuit which may be utilized to provide signal addition of proper amplitudes and polarities of the plurality of color component signals.

It is still another object of this invention to provide an improved matrix circuit for use in a color television transmitter wherein a plurality of component color signals may be added together with the matrix circuit providing signal polarity inversion for selected component color signals.

It is still another object of this invention to provide a matrix means for use in a color television system whereby, utilizing a single electron tube, appropriate quantities of red, blue and green color signals may be combined in proper magnitudes and according to prescribed polarities to yield, for example, color difference signals of the I and Q variety.

According to the invention, a matrixing of a prescribed group of signals is accomplished by utilizing a single amplifier means for amplifying each of a first selected number of a group of signals into an output load at prescribed amplitudes but with the same polarities. The single amplifier means is also used for amplifying a second prescribed number of the group of signals into the output load with prescribed amplitudes but with reverse polarities. The single amplifier means in conjunction with this output load also functions whereby addition of all signals appears in the output load.

In one form of the invention as applied to a matrix amplifier which accepts a trio of component color signals, a single amplifier means in conjunction with an output load amplifies two of the component color signals in the same polarities into the output load. The single amplifier means also reverses the polarity of the third component color signal and amplifies this reversed polarity signal into the output load where it is combined with prescribed amplitudes of the other two component color signals to provide a predetermined color difference signal.

Other and incidental objects of this invention may be understood by the reading of the following specifications and a study of the figures, wherein.

Figures 1, 2, 3:
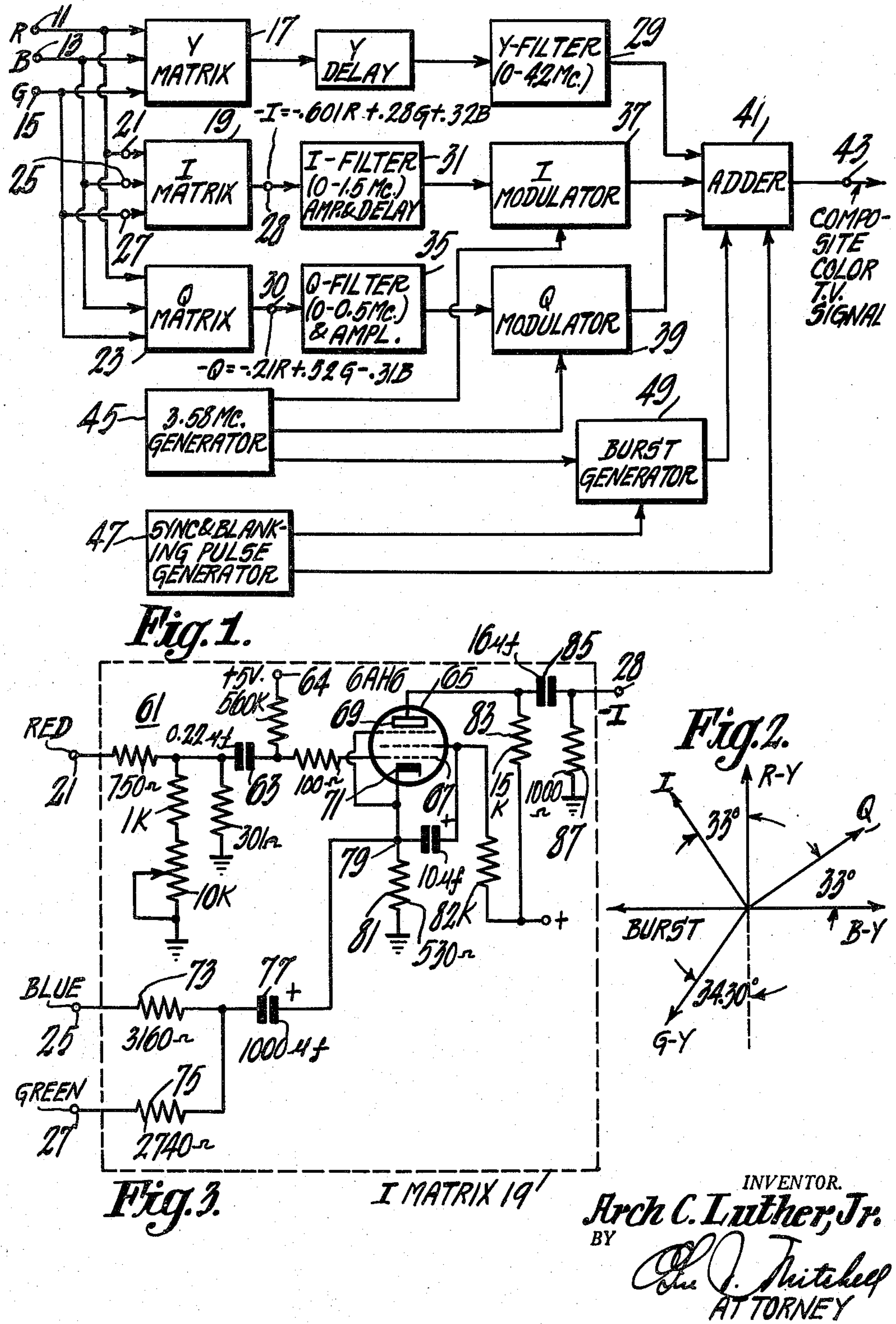
Figure 1 shows a block diagram of a matrix amplifier.
Figure 2 shows a vector diagram relating the phase angles of the bursts, I, Q, $R-Y$, $B-Y$ and $G-Y$ color difference signals.
Figure 3 shows a schematic diagram of an I matrix amplifier.

In general, it may be stated that matrix circuits for generating the I and Q color difference signals, hereinafter referred to as I and Q color signals, in a color television transmitter, must satisfy relationships of the form $$E_x=axE_R+bxE_G+cxE_B$$

where $$a+b+c=0$$

The latter relationship indicates that the sign of at least one of the coefficients must be negative; this requires that a polarity reversing amplifier be utilized somewhere in the matrix circuit. The most important aspect of the circuit performance of such matrix circuits is that the latter relationships be maintained preferably within 0.5% for all signal levels and for long periods of time.

Before describing the amplifier circuit which performs so uniquely the teachings of the present invention, consider first the colorplexer circuit shown in Figure 1. A colorplexer includes a plurality of matrices and is a device for multiplexing the color television signals in accordance with the specifications prescribed by the Federal Communications Commission. The general circuitry associated with colorplexers is described by Gloystein and Turner in their paper entitled "The Colorplexer—A Device for Multiplexing a Color Television Signal in Accordance with the NTSC Signal Specifications" as published in the January 1954 issue of the Proceedings of the I.R.E. A typical colorplex circuit is shown in Figure 1 where red, green and blue component color signals are applied from the color camera to the input terminals 11, 13, and 15 respectively. These terminals are coupled to the Y matrix 17, the I matrix 19 and the Q matrix 23 which generate Y, —I, and —Q signals respectively. The Y signal represents the luminance or monochrome component of the color television signal.

The Y signal having the widest band width of the signals included in the color television signal, namely 4.2 mcs., is passed through the Y filter 29, and the Y delay 40 to the adder 41. The I signal is delivered to the output terminal 28 as a —I signal. The —I signal is passed through the I filter and amplifier 31 wherein only signal components in the pass band from 0 to 1.5 mcs. are allowed to pass and wherein the —I signal is inverted in polarity to yield an amplified I signal. The amplified I signal is then passed through the delay line 42 and applied to the I modulator 37.

The Q matrix 23 provides a —Q signal at the output terminal 30. The —Q signal is then passed through the Q filter and amplifier 35 wherein signal components in a range from 0 to 0.5 mc. are amplified and inverted in polarity to yield an amplified Q signal which is applied to the Q modulator 39.

A 3.58 mc. signal generator 45 is employed to furnish an I phase subcarrier signal to the I modulator 37 and a Q phase subcarrier signal to the Q modulator 39. The outputs of the I modulator 37 and the Q modulator 39 produce respectively a suppressed-carrier I modulated subcarrier and a suppressed-carrier Q modulated subcarrier which are both applied to the adder 41 where they are combined and filtered to yield a chrominance signal having a band width from approximately 2 to 4.2 mcs.

The 3.58 mc. signal generator 45 is also employed to produce a burst-phase signal which is applied to the burst generator 49. In response to gating pulses provided by the sync and blanking pulse generator 47, the burst generator 49 produces color synchronizing bursts which are applied to the adder 41. The vertical and horizontal synchronizing and blanking pulses, which are furnished by the sync and blanking pulses generator 47 are also applied to the adder 41; the output of the adder 41 is then the composite color television signal.

The phases of several of the color difference signals included in the chrominance signals are shown in Figure 2. It is seen that the phase of the $R-Y$ color difference signal lags the phase of the burst by 90° with the $B-Y$ color difference signal in phase quadrature with respect to the $R-Y$ color difference signal. The I and Q signals are in phase quadrature with the phase of the I signal leading the phase of the $R-Y$ color difference signal by 33°. The $G-Y$ color difference signal lags the burst by an angle of 55.7°.

In one form of color television receiver which provides recovery of the composite color television signal, one or more of the component color difference signals included in the chrominance signal are recovered by use of synchronous detection and combined with the Y signal in an appropriate color image reproducer to provide a reconstructed color image.

Figure 3 shows, for example, the schematic diagram of one embodiment of the present invention as used in the I matrix 19 shown in Figure 1; this embodiment serves to illustrate one form of the present invention. By selection of suitable circuit parameters, this embodiment can be utilized for the Q matrix 23.

An electron tube 65 is utilized which includes an anode 69, a control grid 67, and a cathode 71. The cathode 71 is coupled to a cathode terminal 79; a cathode resistor 81 is coupled between the cathode terminal 79 and ground. The video signal representing red, which must undergo polarity inversion in order for proper formation of either an I signal or a —I signal, is applied to the input terminal 21. The input terminal 21 is coupled using the resistance network 61 and the coupling condenser 63, to the control grid 67. The associated network parameters including a grid bias voltage applied to the terminal 64, are chosen to yield the proper magnitudes of red signal at the control grid 67 which will yield a reversed polarity red signal of proper magnitude across the output resistor 83 which is coupled to the anode 69.

The blue signal and the green signal are coupled to the input terminals 25 and 27 respectively; these terminals are coupled through the resistors 73 and 75 and the condenser 77 to the cathode terminal 79 where the blue and green signals are caused to appear across the cathode resistor 81 and thereby cathode-drive the electron tube 65 to cause the blue and green signals to appear across the output resistor 83 at the same polarity and at predetermined amplitudes. By overall choice of circuit parameters and by use of an electron tube of extremely high-$\mu$, signal combination is provided in the output resistor 83 which yields a —I signal which is thereupon coupled to the output terminal 28 by way of resistor 87 and condenser 85. The proper amplitude balance between the color signals appearing across the output resistor 83 is largely dependent upon the proper choice of the resistance values in the circuit; since the electron tube 65 has an extremely high $\mu$, subsequent change or aging of the tube will produce a negligible change in the balance.

In the colorplexer, the output from the various channels which produce the I and Q signals goes to zero for a white picture which is represented by suitable proportions of red, green and blue signals. The matrix amplifiers utilized in the colorplexer in Figure 1 are therefore so designed that under this condition the grid and cathode signals which are applied to the respective electron tubes utilized in the I matrix 19 and the Q matrix 21 are equal. Thus, in these electron tubes, the net-grid to cathode voltage is zero and there will be no output at the anodes of these electron tubes under a condition of a white signal. If the electron tubes are pentodes, this condition may be accurately obtained by by-passing the screened grids of the pentode to the cathode.

Having described the invention, what is claimed is:

1. In a colorplexer, a matrix amplifier comprising the combination of; a source of red, green and blue component color signals; a single electron flow control device having at least an output electrode, a cathode electrode, a control electrode and an output circuit coupled to said output electrode; means for causing a signal applied to said cathode electrode to appear in said output circuit in the same polarity; means for causing a signal applied to said control electrode to be produced in reverse polarity in said output circuit; a first resistance-condenser coupling means for coupling a portion of said red component color signal to said control electrode; and a second resistance-condenser coupling means for coupling different portions of said blue and green component color signals to said cathode electrode whereby a composite signal is available at said output circuit representing different portions of the red, green and blue component color signals in other than identical polarities.

2. A colorplexer comprising the combination of, a source of red, green and blue component color signals, a first matrix means for combining prescribed positive values of red, green and blue component color signals to form a luminance signal; an I signal developing matrix means and a Q signal developing matrix means coupled to said source and each having an output terminal; said I signal developing matrix means and said Q signal developing matrix means each including a single electron flow device having an output circuit and including means to control said electron flow comprising a first electron flow control electrode for developing an applied signal into said output circuit in the same phase; a second electron flow control electrode for developing an applied signal into said output circuit in reverse phase; means to apply said blue and green component color signals to said first electron flow control electrode, means to apply said red component color signal to said second electron flow control electrode; a signal generator; means including said signal generator to provide a first subcarrier signal having a phase identified with said I signal, a second subcarrier signal having a phase identified with said Q signal and a third subcarrier signal having a phase identified as a reference phase, an I filter and modulator means coupled to the output terminal of said I signal developing matrix means and to said signal generator to develop a suppressed carrier I signal modulated subcarrier utilizing said first subcarrier, a Q signal filter and modulator means coupled to the output terminal of said Q signal developing matrix means and to said signal generator for developing a suppressed carrier Q signal modulated subcarrier utilizing said second subcarrier signal, a gate circuit coupled to said signal generator to select bursts of said third subcarrier signal to form a train of color synchronizing bursts, a synchronizing and blanking pulse generator, and an adder means coupled to said synchronizing and blanking pulse generator and responsive to said luminance signal, said train of color synchronizing bursts and said suppressed carrier I and Q signal modulated subcarriers to form a composite color television signal.

References Cited in the file of this patent

UNITED STATES PATENTS

| | | |
|---|---|---|
| 2,231,668 | Hall | Feb. 11, 1941 |
| 2,680,147 | Rhodes | June 1, 1954 |
| 2,697,744 | Richman | Dec. 21, 1954 |
| 2,713,607 | Rhodes | July 19, 1955 |
| 2,807,661 | Espenlaub | Sept. 24, 1957 |